Dec. 30, 1947.                R. T. CORNELIUS                2,433,546
           METHOD AND APPARATUS FOR FORMING PLASTIC RADIATOR CORES
                     Filed Dec. 11, 1943        4 Sheets-Sheet 1
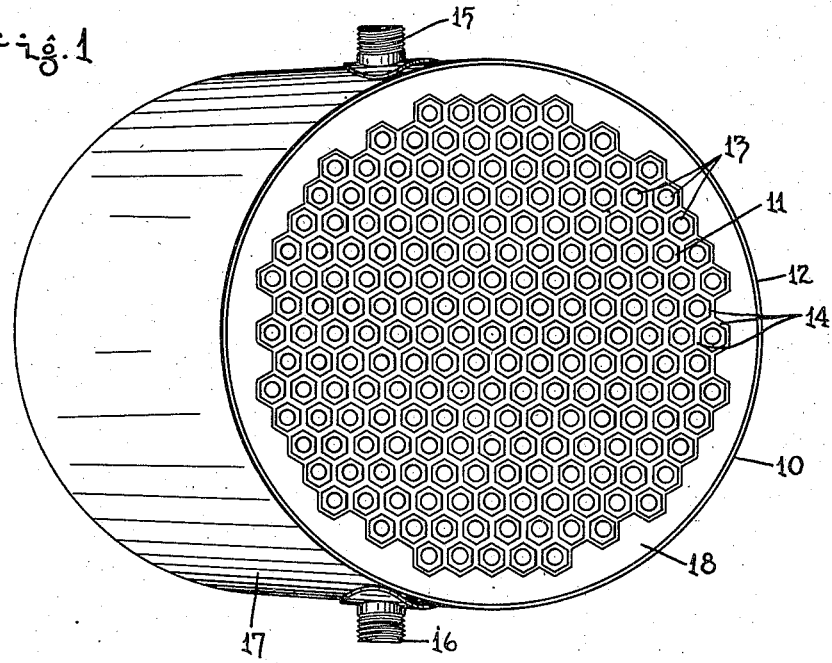
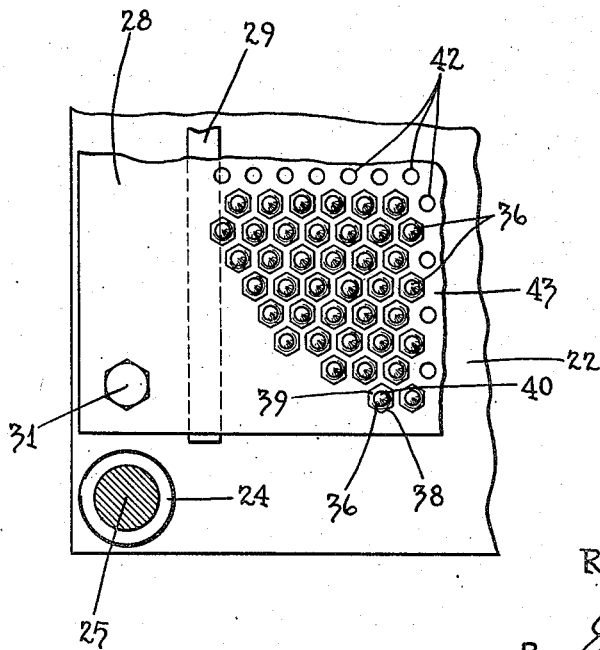
Inventor
Richard T. Cornelius
By Caswell & Lagaard
Attorneys Dec. 30, 1947.  R. T. CORNELIUS  2,433,546
METHOD AND APPARATUS FOR FORMING PLASTIC RADIATOR CORES
Filed Dec. 11, 1943  4 Sheets-Sheet 2

Inventor
Richard T. Cornelius
By Caswell & Lagaard
Attorneys

Dec. 30, 1947.   R. T. CORNELIUS   2,433,546
METHOD AND APPARATUS FOR FORMING PLASTIC RADIATOR CORES
Filed Dec. 11, 1943    4 Sheets-Sheet 3
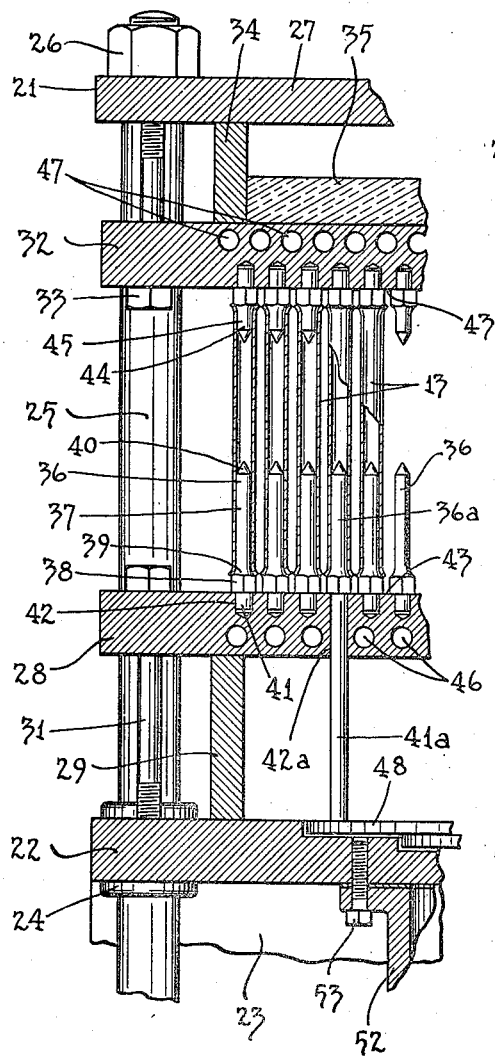
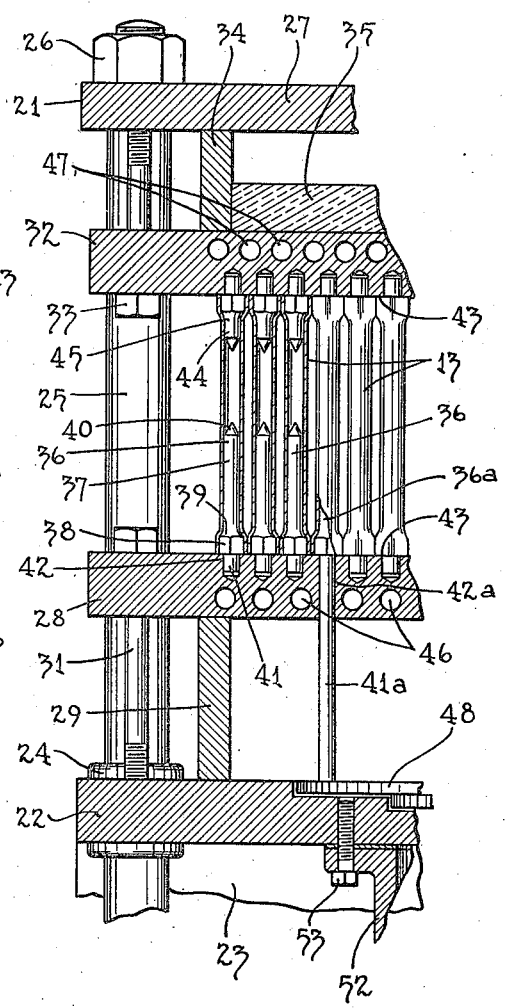
Inventor
Richard T. Cornelius
By Caswell & Lagaard
Attorneys Dec. 30, 1947.   R. T. CORNELIUS   2,433,546
METHOD AND APPARATUS FOR FORMING PLASTIC RADIATOR CORES
Filed Dec. 11, 1943.   4 Sheets-Sheet 4

Inventor
Richard T. Cornelius
By Caswell & Lagaard
Attorneys

Patented Dec. 30, 1947

2,433,546

UNITED STATES PATENT OFFICE 2,433,546

METHOD AND APPARATUS FOR FORMING PLASTIC RADIATOR CORES

Richard T. Cornelius, Minneapolis, Minn.

Application December 11, 1943, Serial No. 513,978

9 Claims. (Cl. 18—59)

My invention relates to the method and apparatus for forming radiator cores.

An object of the invention resides in providing a method of forming radiator cores from plastic materials in which tubes are assembled in spaced relationship and the ends thereof secured together through fusion.

Another object of the invention resides in providing a method of forming radiator cores in which cylindrical tubes are employed and in which the tubes are simultaneously expanded at their ends and fused together.

An object of the invention resides in providing a method of forming radiator cores in which the tubes are arranged in juxtaposed spaced relationship and in which the ends of the tubes are expanded and the walls of the adjacent tubes brought into contact and the contacting ends of the tubes fused together.

An object of the invention resides in providing apparatus for forming radiator cores from plastic material in which a support is provided for a number of tubes, said support consisting of a plurality of spaced mandrels and in which heating means is provided for heating the mandrels to cause fusion of the tubes while supported on the mandrels.

An object of the invention resides in constructing the mandrels near their ends with expanding heads for expanding the ends of the tubes and bringing the same into contact with one another, whereby the ends of the tubes may be fused together.

A still further object of the invention resides in providing apparatus for forming radiator cores in which a bed and a ram movable relative to the bed are employed and to which the mandrels for spacing and supporting the tubes are attached.

Other objects of the invention reside in the novel combination and arrangement of parts and in the details of construction hereinafter illustrated and/or described.

In the drawings:

Fig. 1 is a perspective view of a radiator core constructed in accordance with my invention.

Fig. 3 is a fragmentary view similar to Fig. 2 showing the parts in altered position.

Fig. 4 is a view similar to Fig. 3 showing the ram in its lowermost position.

Fig. 6 is a fragmentary plan sectional view of the lower platen with the radiator core removed therefrom.

Figure 2:
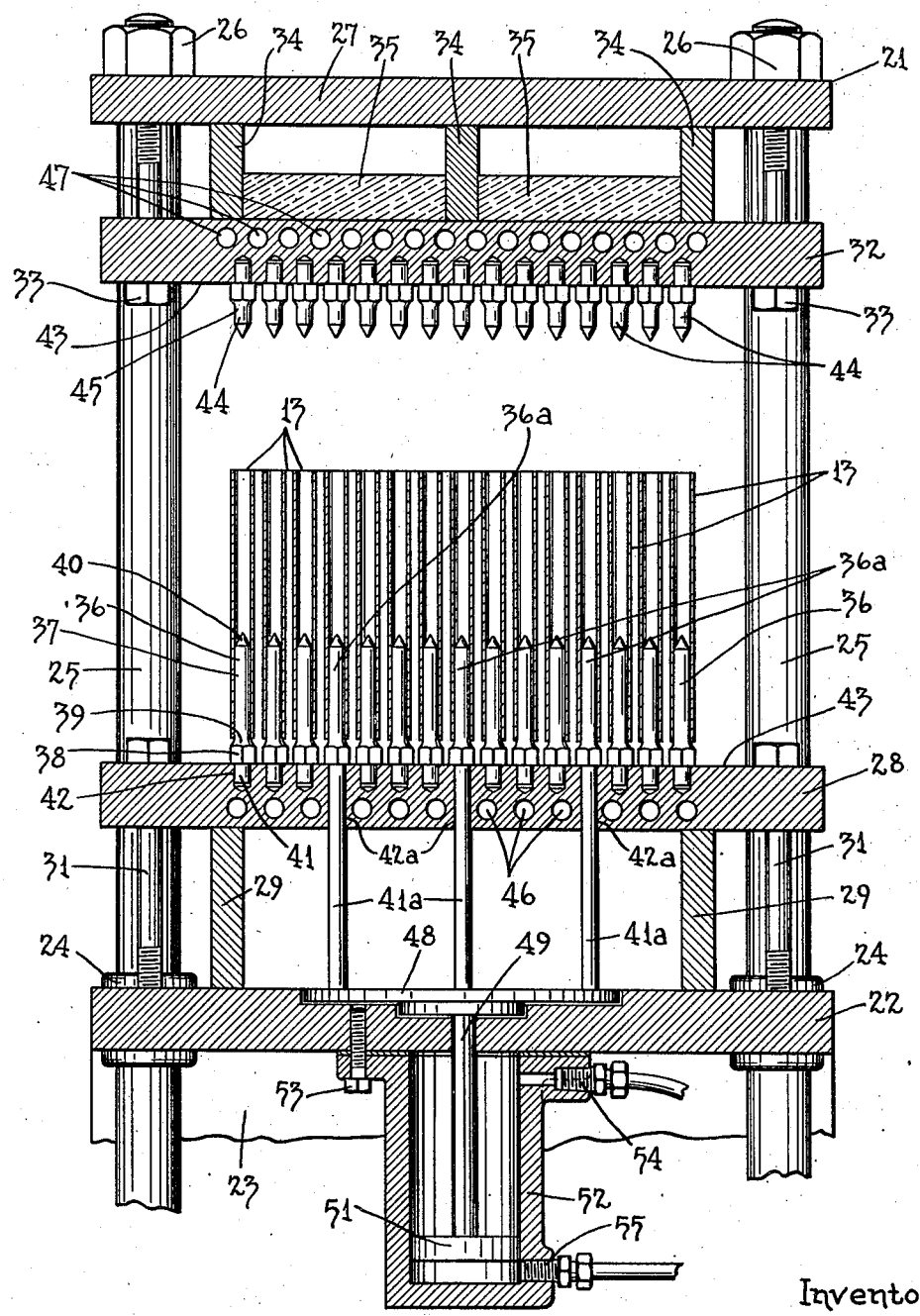
Fig. 2 is an elevational sectional view of apparatus for constructing radiator cores in accordance with my invention.

In the manufacture of radiator cores, metals and particularly copper and brass have been used for forming the tubes thereof. Metals are usually heavy and subject to corrosion and the action of various chemicals. I have found that numerous plastics, now readily available, are capable of resisting corrosion and the action of chemical agents and are almost as efficient as metals for the transfer of heat. Such materials are relatively light in weight as compared with metals. The present invention overcomes the objection to metal in the construction of radiator cores by providing a core capable of being constructed of plastic tubing and by providing a method and apparatus for forming the same.

In Fig. 1, I have shown in perspective a radiator constructed in accordance with my invention and indicated in its entirety by the reference number 10. This radiator comprises a core 11 which is mounted in a shell 12. The core 11 consists of a number of cylindrical tubes 13 which are disposed in spaced relation and which are secured together at their ends as indicated at 14. By means of this arrangement, ducts are formed axially through the tubes through which the passage of one fluid may occur and at the same time, spaces are provided about the exterior of the tubes through which the passage of another fluid may occur. These latter spaces are confined within the shell 10 and communicate with the passages through inlet and outlet nipples 15 and 16 which are attached to the shell 10. The shell 10 comprises a cylindrical portion 17 and two end walls 18 which are secured to the tubes 13 and also to the wall 17. The construction of the core 11, the method of forming the same and the apparatus by means of which the core is constructed constitute the principal features of the invention and will now be described in detail.

For the purpose of producing the core and carrying out the method of my invention, I employ apparatus best shown in Figs. 2 and 6 which is in the nature of a press and which is indicated in its entirety by the reference character 21. This press comprises a bed 22 which is mounted on suitable supports 23 carried on a proper base or other supporting structure, not shown in the drawings. The bed 22 has mounted in it a number of bushings 24 which slidably support a number of vertically extending rods 25. The upper ends of the rods 25 have attached to them by means of nuts 26 a ram 27 which is movable with said rods. When the rods 25 are lowered, or raised, the ram 27 is moved toward the bed 22 or vice versa. The rods 25 are connected together at their lower ends by any suitable construction which has not been shown in the drawings, and are reciprocated by means of a hydraulic or other fluid operated piston and cylinder, in accordance with the usual practice. Since any suitable construction may be employed for this purpose, the same has not been shown in the drawings.

Carried by the bed 22 is a platen 28 which rests on two cross-bars 29 and is attached to said bed by means of bolts 31 extending through the platen 28 and threaded into the bed 22. By means of this construction, the platen 28 is spaced from the bed 22 and greatly heat-insulated therefrom. In a similar manner, a platen 32 is carried by the ram 27. A number of bolts 33 extend through the platen 32 and are threaded into the ram 27. Spaced bars 34 are disposed between said platen and ram and hold the platen spaced from the ram and prevent excess heat transfer between the platen and ram. If desired, insulating material, such as designated at 35, may be placed between the ram 27 and the platen 32.

Attached to the platen 28 are a number of mandrels 36 which are substantially identical in construction. Only one of these mandrels will be described in detail. This mandrel comprises a stem 37 of a diameter such as to freely receive one of the tubes 13 used in the forming of the radiator core. This portion of the mandrel is cylindrical in form to conform to the bore of the tube. At the lowermost portion of the stem 37, the mandrel 36 is formed with a head 38 of hexagonal shape which is connected to the cylindrical stem 37 by means of a flared connecting portion 39. At the lowermost end of the mandrel is provided a shank 41 which is received in a hole 42 drilled in the face 43 of the platen 28. The mandrels are preferably pressed into these holes and, when properly mounted therein, the heads 36 of said mandrels rest upon the upper face 43 of the platen 28. The extreme upper end of the stem 37 of mandrel 36 is conical in form, to provide a pilot 40 for readily guiding the tube in position upon the mandrel. The mandrels 36 are spaced apart a distance such that the distance between any of the two surfaces of the hexagonal heads 38 as shown in Fig. 6, is slightly less than twice the thickness of the walls of the tubes 13 after expansion.

The platen 32 is provided with a number of mandrels 44 which correspond with the mandrels 36 and which are disposed in alignment therewith and directly above the same. These mandrels are constructed the same as the mandrels 36, except that the stems 45 thereof are considerably shorter than the stems 37 of the mandrels 36. These mandrels are adapted to enter the upper ends of the tubes when the ram 27 is lowered, as will hereinafter be more fully described.

The two platens 28 and 32 are provided with a number of passageways 46 and 47. These passageways are connected to a suitable conduit, not shown, whereby any heat transfer fluid may be passed for the purpose of heating or cooling the platens 28 and 32 and the mandrels 36 and 44 mounted thereon. Inasmuch as such construction is well known in the art, the same has not been shown in detail in the drawings.

The method of the invention is carried out as follows: The press 21 is first opened by raising the ram 27 to the position shown in Fig. 2, in which the distance between the pilots of the two sets of mandrels 36 and 44 is greater than the length of the tubes to be used in the formation of the radiator core. A number of tubes 13 are then assembled upon the mandrels 36 by placing the same over the mandrels and allowing the tubes to fall downwardly upon the same. Even though the tubes are held tightly together when being assembled, as soon as the same are released, if not too many tubes are handled at one time, the pilots 40 on the mandrels center the tubes and direct them into position so that the tubes may slide downwardly along the stems 37 of the mandrels and until the ends of the tubes rest upon the flaring connecting portions 39 of the mandrels 36. The arrangement of the tubes when so disposed is shown in Fig. 2. The procedure is continued until each mandrel has a tube mounted in it. Upon now lowering the ram 27 into place, the shanks 45 of the mandrels 44 enter the upper ends of the tube until the tubes assume the position shown in Fig. 3. The relative movement between the ram and the bed of the press is now either retarded or arrested, so that the heat from the platens and mandrels can soften the ends of the tubes. After these tubes are sufficiently softened, relative movement between the ram and bed continues and the ends of the tubes follow along the flaring connecting portions 39 of the mandrels, as shown in Fig. 3. As relative movement between the ram and bed continues, the tubes are expanded over the heads 38 of the mandrels and the walls of the tubes adjacent these heads are forced into intimate contact. When the extreme ends of the tubes reach faces 43 of the platens 28 and 32, as shown in Fig. 4, the said tubes are at the temperature of fusion and are fused together, so as to make a unitary construction. Here again, if the movement of the ram is slow enough, the temperature of fusion is reached when the ends of the tubes arrive at the faces of the platens. If, however, the temperature is insufficient, the elements of the press may be held in position until the ends of the tubes arrive at the fusion temperature and the tubes can weld together.

After the core has been formed, a coolant is run through the passageways 46 and 47, and the platens 28 and 32 and mandrels 36 and 44 chilled sufficiently to bring the temperature of the tubes below the fusion temperature. The core is then completed and may be removed from the apparatus by any suitable means.

For the sake of illustration, I have shown in the drawings, a construction by means of which the core may be readily removed from the mandrels on which the same is formed. For this purpose, certain of the mandrels 36, which are designated by the numeral 36a, are provided with shanks 41a which extend completely through the platen 28 and which are guided for vertical movement in the holes 42a formed in said platen and in which they are disposed. These shanks are all attached to a supporting plate 48 disposed below the platen 28 which is carried by a piston rod 49 having a piston 51 attached thereto. The piston 51 is movable in a cylinder 52 attached to the under side of the bed 22 by means of bolts 53. The cylinder 52 has pipe fittings 54 and 55 attached to it by means of which a fluid under pressure may be directed into either end of said cylinder to move the piston 51 in opposite directions.

Figure 5:
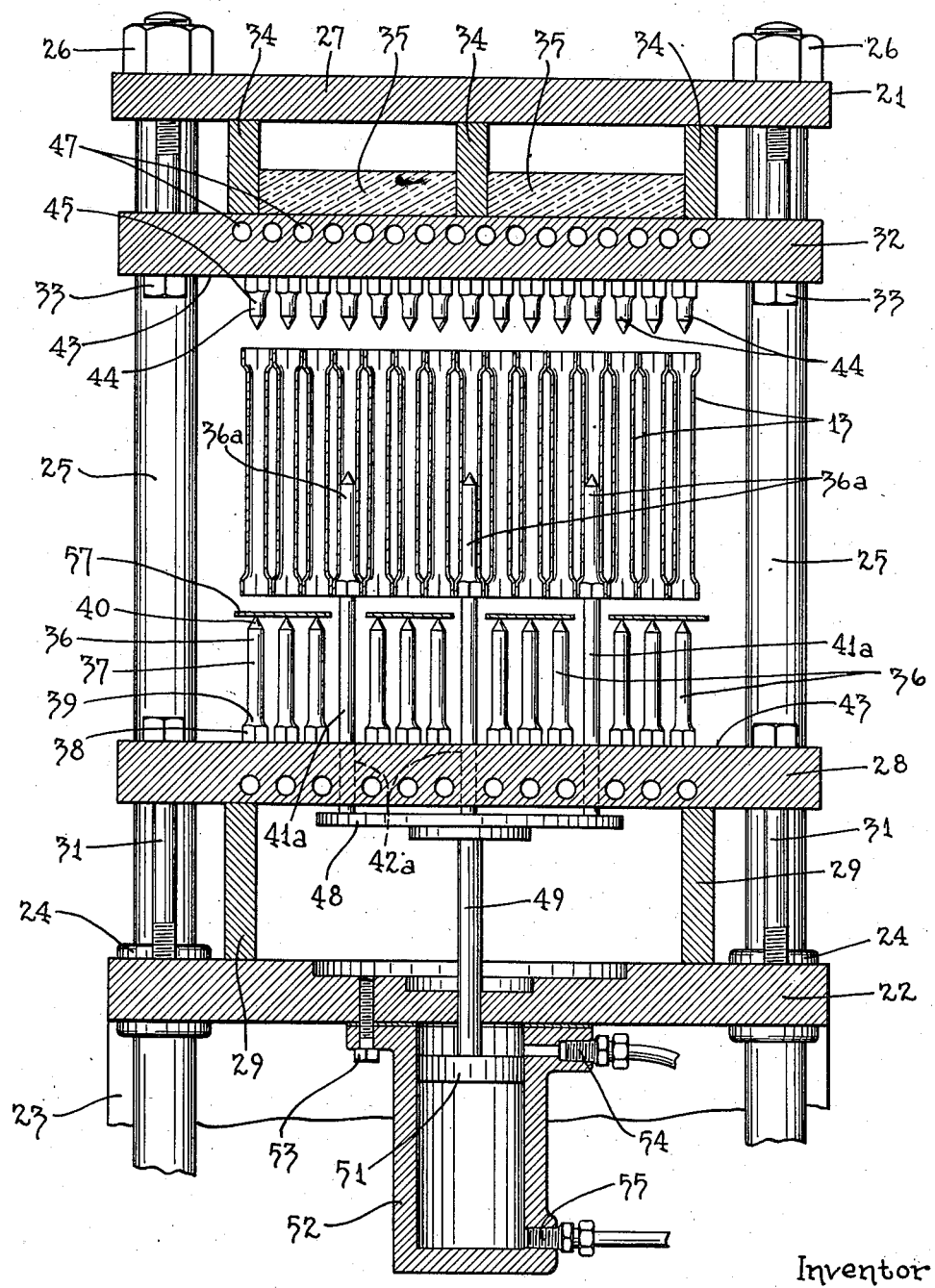
Fig. 5 is a view similar to Fig. 2 showing the ejecting mechanism in raised position.

In the removal of the core from the machine by the construction illustrated, the parts, after formation, occur, are arranged as shown in Fig. 4. If the ram 27 is now raised, the mandrels 44 are withdrawn from the upper ends of the bores of the tubes 13 of the core. This follows due to the fact that the stems of these mandrels are considerably shorter than the stems of the mandrels 36 and the surface to which the tubes may adhere is considerably less than the surface of the mandrels 36 to which the said tubes may adhere. The parts then become arranged as shown in Fig. 2, excepting that the core occupies the position relative to the mandrels 36, as shown in Fig. 4. Piston 51 is now raised which elevates all the mandrels 36a attached to the plate 48. Due to the heads 38 on these mandrels, the entire core structure is raised and the tubes withdrawn from the remaining mandrels 36. The parts then become arranged as shown in Fig. 5.

A slotted separator plate, such as indicated at 57, is now inserted between the lower ends of the core and the pilots 40 of the mandrels 36. Piston 51 is thereafter lowered and the mandrels 36a removed from the respective tubes in which they are received and brought down to the same level as the remaining mandrels 36. The core now loosely rests upon the plate 57, which, together with the core may be readily removed from the machine.

After the radiator core has been completed, the same is mounted in the shell 10. For a substantially cylindrical radiator design, the end walls 18 of the shell are sheared to correspond with the irregular contour of the core and the end walls welded to the adjoining edges of the core by means of the usual apparatus now employed for uniting fusible materials. The nipples 15 and 16, when constructed of plastic, may also be welded to the cylindrical wall 17, or where metal is desired, the same may be clamped in place by means of flanges and nuts, as is now customary practice.

My invention is highly advantageous in that it provides an extremely simple and practical method for forming radiator cores out of materials capable of resisting chemical action. The tubes of the core are simultaneously fused together at their ends in a single operation and without the use of solder, thus reducing the time necessary to unite the tubes. The materials capable of use for making radiators in accordance with my invention are considerably cheaper than metals and will outlast cores constructed from metals. With my invention, the weight of the core can be greatly reduced. The core, when constructed of certain plastics, is more or less elastic, and where the radiator is used for liquids such as water, cracking of the tubes through freezing will not occur. Also, breaking of the radiator cores through impact or otherwise is prevented. The method is simple and inexpensive and consumes a small amount of time. The apparatus can be constructed from an ordinary molding press by building into it the platens and mandrels carried thereby and the other necessary devices.

Changes in the specific form of my invention, as herein described, may be made within the scope of what is claimed without departing from the spirit of my invention.

Having described my invention, what I claim as new and desire to protect by Letters Patent is:

1. The method of forming radiator cores which consists in assembling a plurality of tubes of fusible material in juxtaposition and in spaced relation to one another, in applying expanding and shaping means to the ends of the tubes while assembled to cause the walls of the adjacent tubes to contact one another, in holding the tubes while expanded with the ends in contacting relationship in fusing the edges of the contacting portions of the tubes together while so held and in thereafter removing the expanding and shaping means from the tubes.

2. The method of forming radiator cores which consists in assembling a plurality of cylindrical tubes on a number of corresponding mandrels disposed in spaced relation to one another and having stems over which the tubes are readily passed and having heads at the ends thereof provided with surfaces spaced apart a distance less than twice the thickness of the walls of the tubes, in directing the tubes along said mandrels and forcing the ends of the tubes over the heads of the mandrels to expand and form the ends of the tubes with contacting surfaces and in securing the contacting surfaces of the tubes together while supported on the mandrels.

3. The method of forming radiator cores which consists in assembling a plurality of cylindrical tubes constructed of plastic material on a number of corresponding mandrels disposed in spaced relation to one another and having stems over which the tubes are readily passed and having heads at the ends thereof provided with surfaces spaced apart a distance less than twice the thickness of the walls of the tubes, in heating the mandrels, in directing the tubes along said mandrels and forcing the ends of the tubes over the heads of the mandrels to expand and form the ends of the tubes with contacting surfaces and in securing the contacting surfaces of the tubes together while supported on the mandrels.

4. The method of forming radiator cores which consists in assembling a plurality of cylindrical tubes constructed of an expansible fusible material on a number of corresponding mandrels disposed in spaced relation to one another and having stems over which the tubes are readily passed and having heads at the ends thereof provided with surfaces spaced apart a distance less than twice the thickness of the walls of the tubes, said mandrels being supported on a platen, in heating the platen and mandrels, in directing the tubes along said mandrels and forcing the ends of said tubes over the heads of the mandrels to expand and form the ends of the tubes with contacting surfaces, in urging the ends of the tubes against the platen to fuse the tubes together, in cooling the platen and mandrels to cause solidification of the tubes and in removing the tubes from the mandrels.

5. Apparatus for forming radiator cores comprising two platens, a plurality of mandrels issuing outwardly from one of said platens and arranged in close proximity to one another, said mandrels having stems over which a plurality of tubes to be formed into the core may be passed, heads at the ends of said mandrels adjacent said platen, said heads having juxtaposed surfaces spaced apart a distance less than twice the thickness of the walls of the tubes, heat exchange conduits formed in said platen and correspondingly formed mandrels disposed on the other of said platens and arranged in axial alignment with the mandrels on the first named platen.

6. The method of forming radiator cores which consists in assembling a plurality of cylindrical tubes constructed of an expansible fusible material on a number of corresponding mandrels disposed in spaced relation to one another and having stems over which the tubes are readily passed and having enlarged heads at the ends thereof provided with juxtaposed surfaces, in expanding the ends of said tubes over said heads and in fusing the expanded ends of the tubes together while disposed on said mandrels and in removing the core from said mandrels after fusion.

7. The method of forming radiator cores which consists in assembling a plurality of cylindrical tubes constructed of an expansible fusible material on a number of corresponding mandrels disposed in spaced relation to one another and having stems over which the tubes are readily passed and having enlarged heads at the ends thereof provided with juxtaposed surfaces in heating the ends of the tubes to fusing temperature and in forcing the tubes over said heads to expand the same and bring the ends of the tubes into fusion while disposed on said mandrels and in removing the core from said mandrels after fusion.

8. The method of forming radiator cores which consists in assembling a plurality of tubes of fusible material in juxtaposition and in spaced relation to one another, in applying expanding and shaping means to the ends of the tubes while assembled to cause the walls of the adjacent tubes to contact one another, in holding the tubes while expanded with the ends in contacting relationship, in heating said expanding and shaping means to cause fusion of the tubes, in cooling the expanding and shaping means to cause solidification of the ends of the tubes and in thereafter removing the expanding and shaping means from the tubes.

9. The method of forming radiator cores, which consists in assembling a plurality of cylindrical fusible tubes on a number of corresponding mandrels disposed in spaced relation to one another and having stems over which the tubes are readily passed and having heads at the ends thereof, in directing the tubes along said mandrels and forcing the ends of the tubes over the heads of the mandrels to expand and shape the ends of the same with juxtaposed surfaces, in heating the mandrels to secure the juxtaposed surfaces of the tubes together, in cooling the mandrels, and in thereafter removing the mandrels from the tubes.

RICHARD T. CORNELIUS.

REFERENCES CITED

The following references are of record in the file of this patent:

UNITED STATES PATENTS

| Number | Name | Date |
|---|---|---|
| 2,214,505 | Magnenat | Sept. 10, 1940 |
| 2,284,072 | Schmidt | May 26, 1942 |
| 2,282,421 | Luby | May 12, 1942 |
| 2,303,416 | Woods | Dec. 1, 1942 |
| 2,369,006 | Banks | Feb. 6, 1945 |
| 1,733,646 | Coffelder | Oct. 29, 1929 |
| 1,740,098 | Karmazin | Dec. 17, 1929 |
| 2,191,631 | Shutts et al. | Feb. 17, 1940 |
| 2,298,996 | Woods | Oct. 13, 1942 |
| 2,313,315 | Blair | Mar. 9, 1943 |
| 2,249,952 | Gerstung | July 22, 1941 |
| 2,225,856 | Buck | Dec. 24, 1940 |